United States Patent
Langbakk et al.

[11] Patent Number: 5,974,987
[45] Date of Patent: Nov. 2, 1999

[54] SEED DRILLING IMPLEMENT

[75] Inventors: Hans Petter Langbakk, Sandnes; Torstein Salte, Kleppe, both of Norway

[73] Assignee: Kverneland Klepp AS, Kvernaland, Norway

[21] Appl. No.: 08/860,127

[22] PCT Filed: Nov. 1, 1996

[86] PCT No.: PCT/GB96/02661

§ 371 Date: Jun. 30, 1997

§ 102(e) Date: Jun. 30, 1997

[87] PCT Pub. No.: WO97/16061

PCT Pub. Date: May 9, 1997

[30] Foreign Application Priority Data

Nov. 3, 1995 [GB] United Kingdom .................... 9522547
Jan. 20, 1996 [GB] United Kingdom .................... 9601170

[51] Int. Cl.[6] .................................................. A01C 5/00
[52] U.S. Cl. .............................. 111/152; 111/55; 111/59; 172/180; 172/165; 172/657
[58] Field of Search ........................ 111/149, 151, 111/152, 162, 159, 161, 52, 53, 55, 59–62; 172/677, 679, 464, 605, 613, 624, 632, 633, 657, 799.5, 174, 180, 166

[56] References Cited

U.S. PATENT DOCUMENTS

| | | |
|---|---|---|
| 2,691,353 | 10/1954 | Secondo . |
| 3,756,203 | 9/1973 | Dedoes ...................................... 172/464 |
| 4,004,640 | 1/1977 | Bland ...................................... 111/52 X |
| 4,141,302 | 2/1979 | Morrison, Jr. et al. ..................... 111/52 |
| 4,191,262 | 3/1980 | Sylvester ............................... 111/52 X |
| 4,271,912 | 6/1981 | Frye ....................................... 172/441 |
| 4,311,104 | 1/1982 | Steilen et al. . |
| 4,377,979 | 3/1983 | Peterson et al. . |
| 4,417,530 | 11/1983 | Kopecky .............................. 111/151 X |
| 4,607,581 | 8/1986 | Kopecky .............................. 111/151 X |
| 4,624,197 | 11/1986 | Drake ....................................... 111/52 |
| 4,648,334 | 3/1987 | Kinzenbaw ............................... 111/52 |
| 4,785,890 | 11/1988 | Martin .................................. 111/52 X |
| 5,406,897 | 4/1995 | Pingry ...................................... 111/59 |

*Primary Examiner*—Victor Batson
*Attorney, Agent, or Firm*—Workman, Nydegger and Seeley

[57] ABSTRACT

There is disclosed a seed drilling implement (10) which comprises a frame (11), a coupling device (12) at the forward end of the frame (11), drilling elements (13) mounted on the frame (11) at or near the rear end of the frame, coulters (14) mounted on the frame (11) forwardly of the respective drilling elements (13), forward packer elements (15) mounted on the frame (11) forwardly of the coulters (14) and arranged at least partly to support the frame (11) in order to control the operating depths of the coulters (14) and the drilling elements (13), and an associated rear packer element (16) mounted rearwardly of the respective drilling element (13), and arranged to exert a soil-packing operation over each seeded row formed by the drilling element.

21 Claims, 11 Drawing Sheets

SEED DRILLING IMPLEMENT

This invention relates to a seed drilling implement which is intended to be mounted behind a tractor or other propelling vehicle, and to form drills in the ground into which seed can be introduced.

The invention is particularly suitable for use as a direct drilling machine, but it should be understood that the invention may also be applied to a seed drill which introduces seed into already ploughed ground, or at least partly cultivated soil.

In the past, it has been common practice to plough, and then harrow, and then last of all to carry out seed drilling. This is a costly exercise in labour and fuel costs, and in many areas there have been problems with wind and water erosion of the field. Therefore, it has become more common practice, in such areas, to omit the ploughing and harrowing stages, and to drill directly into the field in the form in which it has been left after the last harvest. The straw and plant residuals, and stubble, protect the surface of the soil, so that wind and water do not have the opportunity to erode the soil, as can be the case with the previous practice of first ploughing and then harrowing, before seed drilling.

A seed-drilling implement according to the invention may be mounted at the rear of a propelling vehicle via a weight transfer coupling of the general type disclosed in U.S. patent application Ser. No. 08/737,972, and which teaches an improved coupling mechanism which transfers part of the weight of the propelling vehicle (agricultural tractor) to the frame of the implement, to increase the downward load applied to ground working implements, which is additional to the gravity load of the implement). The disclosure in this copending patent application is incorporated herein by reference.

However, it should be understood that the use of such a weight transfer coupling is only one preferred example of a coupling which may be used in the present invention, and that this invention also includes the possibility of use of any suitable other existing type of rear coupling to a usual rear 3-point linkage of an agricultural tractor.

The provision of a weight transfer type of coupling (from the rear of the propelling vehicle to the front part of the frame of the drill) is particularly preferred, in that it allows a lightweight seed drill to be designed, while still providing a sufficient downward force on the drilling elements despite the smaller gravity effect of a lightweight implement.

According to one aspect of the invention, there is provided a seed drilling implement which comprises:
 a frame;
 coupling means at the forward end of the frame to couple the implement to the rear of a propelling vehicle;
 drilling elements mounted on the frame at or near the rear end of the frame;
 coulters mounted on the frame forwardly of the respective drilling elements and operable to carry out preliminary opening of the ground and prior to engagement of the opened ground by the drilling elements;
 packer elements mounted on the frame forwardly of the coulters and arranged at least partly to support the frame so as to control the operating depth of the coulters and the drilling elements; and,
 an associated packer element mounted rearwardly of the respective drilling element, and arranged to exert a soil-packing operation over each seeded row formed by the drilling element.

A seed drilling implement according to the invention is particularly, though not exclusively, suitable for use as a direct drilling machine. Use of such a machine involves direct drilling into the ground, without first carrying out ploughing and harrowing stages, and the arrangement of the forward mounted packer elements, and following coulters, is particularly effective in carrying out preliminary working of the surface of the ground e.g. plant residuals, stubble and straw, and the cutting action of the coulters can prevent any straw from clogging-up the following working tools of the implement.

Preferably, each drilling element and associated rearwardly mounted packer element are mounted on a common mounting bracket, which is pivotally mounted at the trailing end of a swing arm.

A bell crank lever and a spring, each mounted on the frame, may be coupled with the bracket, so as to be operative to control the position taken-up by the drilling element so that the latter can follow a varying ground profile.

Preferably, the packer elements comprise individual "packer wheels", each mounted forwardly of a respective disc coulter. However, other types of packer elements may be used having continuous contact surfaces, although such surfaces may be provided with patterns to resist soil-adhesion to the wheel if required e.g. roller-type packers.

Preferably, the coupling means is arranged to be capable of transferring part of the weight of the propelling vehicle to the frame in order to apply downward force to the coulters and to the drilling elements, which is additional to the gravity force of the seed drilling implement.

Preferably, each coulter comprise a rotatable disc, which has been found to be particularly effective in slicing through stubble, plant residues and into the ground, after the latter have just been pressed down by the preceding packer element.

Each disc coulter is preferably adjustable in height relative to the frame, and may be provided with a tripping/reset mechanism which allows the disc to be displaced temporarily from its normal working depth by a buried obstacle e.g. a stone, and after the obstacle has been passed, to revert automatically to its working depth.

Each drilling element may take the form of a tine having a share mounted thereon e.g. a so-called "wing point share", and arranged to form a furrow, or enlarge a furrow formed by the preceding disc coulter. Any suitable seed distribution system may be provided to deliver seed to the share, and this may comprise a proprietary pneumatically operated distribution system having flexible tubes leading to each share in order to deliver seed thereto at a required rate.

The rear packer elements also preferably take the form of so-called "packer wheels" although other packers may be utilised.

Each tine (and share) forming a respective one of said drilling elements is preferably carried by a bracket which is pivotally mounted on a rear part of the general frame of the implement. A respective packer wheel is also mounted on this bracket, and by virtue of the pivotal mounting of the bracket, the rear packer wheel can follow undulation in the ground surface, and cause compensatory adjustment of the angle of the bracket about its pivot, so as to cause compensating adjustment in the angle of the share which is carried by the lower end of the tine. Preferably, a leaf spring, or other spring biasing is provided to urge the rear packer wheel downwardly into contact with the ground, and to provide resilient opposition to upward movement of the packer wheel, and by this means, a self-adjusting arrangement is provided.

Thus, the rear packer wheel and the corresponding tine and share can follow undulations in the ground, and the angle of the share is automatically adjusted depending upon the nature of the undulations. If, for example, there is a recess in the ground, (for instance formed by a wheel track), the rear packer wheel lowers itself relative to the general frame of the implement. The spring force which normally presses the packer wheel downwardly becomes smaller, but because of the pivoting of the bracket, the tilting angle of the share becomes steeper. The share therefore takes up a different angle of inclination, to compensate automatically for variation in the ground surface which it is traversing. This is effectively a type of "self-seeking" action, which contributes to maintenance of substantially even drilling depth, despite undulation in the ground surface. The tilting action of the share also assists in causing the rear packer wheel to follow the ground.

In the case of shallow drilling, the angle of the share can take up a small angle relative to the ground, and thereby the share can pass smoothly through the soil and not throw away the soil from the seed furrow when drilling at high speed.

According to a further aspect of the invention there is provided a seed drilling implement which comprises:

a frame;

coupling means at the forward end of the frame to couple the implement to the rear of a propelling vehicle;

drilling elements mounted on the frame at or near the rear end of the frame;

coulters mounted on the frame forwardly of the respective drilling elements and operable to carry out preliminary opening of the ground and prior to engagement of the opened ground by the drilling elements;

packer elements mounted on the frame forwardly of the coulters;

rear packer elements, each associated with a respective drilling implement;

a mounting bracket on which the rear packer elements are mounted, and which is coupled with the rear end of a swing arm, the packer elements being engageable with the ground to follow its surface, and to cause upward and downward adjustment of the swing arm as a consequence of such undulations;

a pivot carried by said mounting bracket, and on which is pivotally mounted a tine carrying a share at its lower ground engaging end;

a resilient biasing arrangement operative to apply a restoring moment to the tine so as to provide resilient biasing to the tine in opposition to drag forces applied by the ground to the tine and the share; and means permitting limited pivoting movement of the tine against the biasing arrangement when the drag force exceeds a predetermined limit.

Preferred embodiments of seed drilling implement according to the invention will now be described in detail, by way of example only, with reference to the accompanying drawings, in which.

Figure 1A:
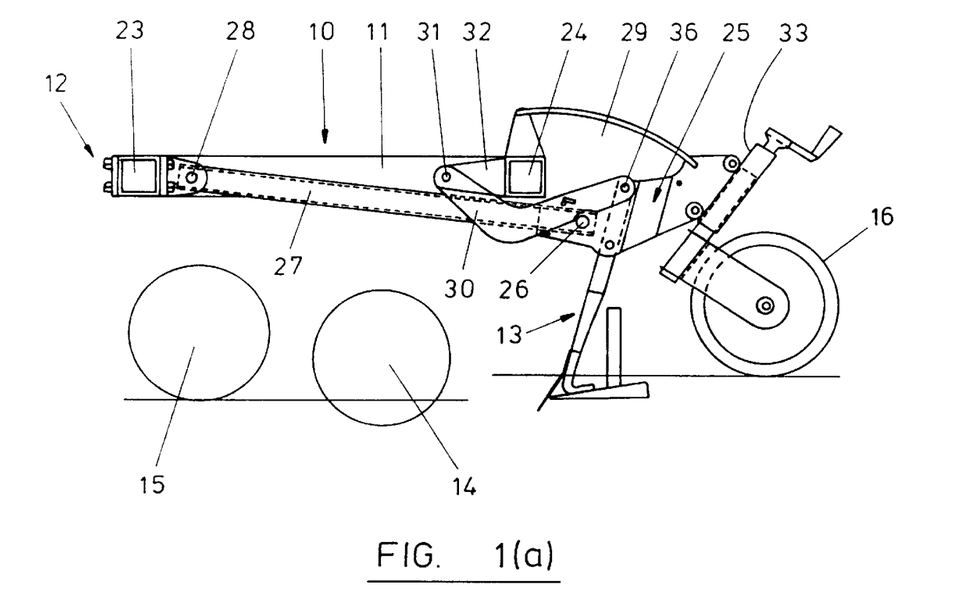
FIGS. 1a, b and c are detail side illustrations of part of a first embodiment of seed drilling implement according to the invention, and showing different positions taken up by ground and soil engaging components of the implement according to varying ground conditions.
Figure 1B:
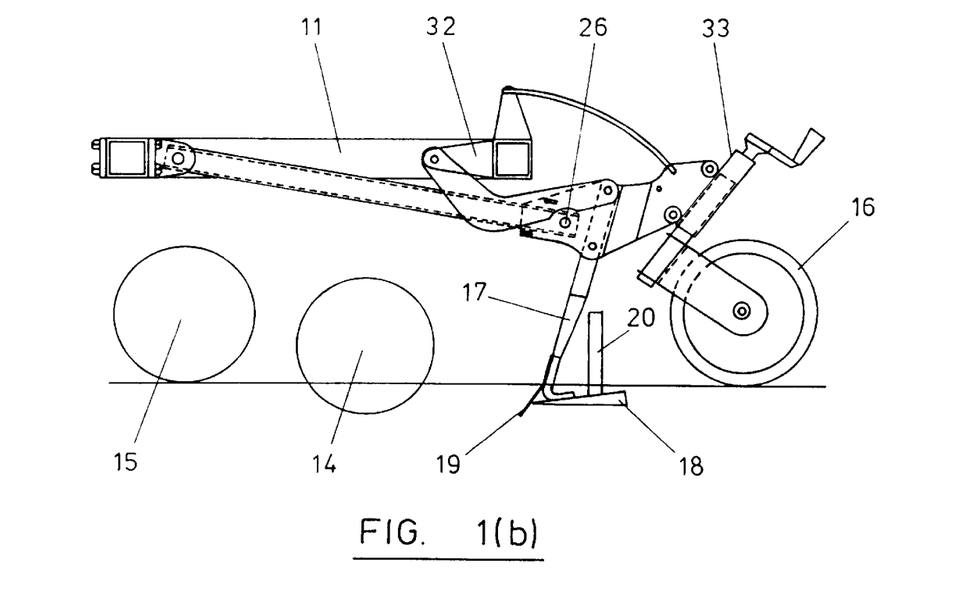
Figure 1C:
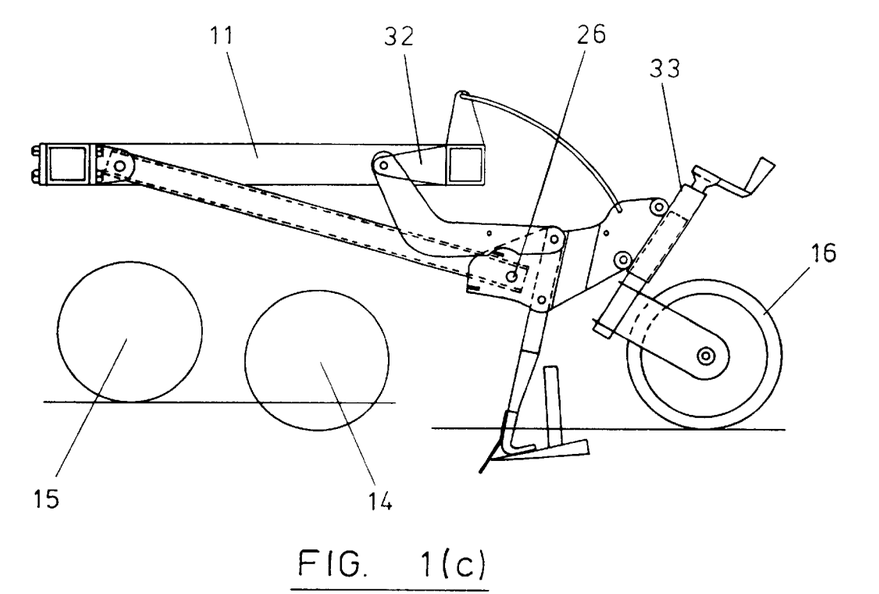

Referring first to the first embodiment shown in FIGS. 1 to 4 of the drawings, and in particular to FIG. 1, there is shown a part only of the frame of a seed drilling implement according to the invention, and which can be employed as a "direct drilling machine", or as a seed drill which is operative on ploughed or at least partly cultivated soil.

Although not shown in detail, preferably the forward part of the frame of the implement is provided with "coupling means" which can enable the forward end of the frame to be mounted at the rear of a propelling vehicle, and preferably via the usual 3-point linkage at the rear of an agricultural tractor. This coupling means is preferably of such a type that part of the weight of the tractor is transferred to the frame of the implement, so that, in addition to the gravity load of the frame of the implement and its ground/soil working tools, there is weight transfer from the tractor, to further increase the downward force applied to the tools. This enables a lightweight frame of drilling implement to be provided, if required.

The preferred arrangement of the coupling means is as is disclosed in more detail in the specification and drawings of U.S. patent application Ser. No. 08/737,972, the disclosure of which is incorporated herein by reference. However, the depth wheels as disclosed in the co-pending application will be omitted, and front mounted "packer wheels" (described in more detail below in the embodiment of the present invention) will be employed to control the working depth of the tools.

However, it should be understood that use of the weight transfer mechanism of the co-pending application is merely one preferred example of a coupling means which may be employed in this invention. Any other suitable coupling means, including existing designs of coupling, may be employed to couple the forward end of the frame of the implement to a rear of tractor or other propelling vehicle.

Referring now in particular to FIG. 1 of the drawings, the seed drilling implement according to the invention is designated generally by reference 10, and, for convenience, only a single set of successive ground and soil engaging tools of the implement will be described and illustrated, although it should be understood that a similar set of tools will be arranged throughout the width of the implement. The implement comprises a frame on which the ground and soil working tools are mounted, and the main part of such frame is designated by reference 11. As described above, suitable coupling means (not shown) is provided at the forward end 12 of the frame 11, to couple the implement to the rear of a propelling vehicle.

Drilling elements are mounted on the frame 11, at or near to the rear end of the frame, and one of which is shown and designated generally by reference 13. A coulter 14 is mounted on the frame 11 forwardly of the drilling element 13, and preferably comprises a rotatable coulter disc. It is intended to carry out preliminary opening of the ground, by forming a preliminary furrow which is subsequently engaged by the drilling element 13, to carry out formation of a pair of laterally spaced drills in the furrow and into which seed can be introduced.

A packer element 15 is mounted on the frame 11, forwardly of the disc coulter 14, and is arranged at least partly to support the frame 11 so as to control the operating depth of the disc coulter 14 and the drilling element 13.

Any suitable type of packer element may be provided, although the preferred form is a so-called packer wheel, the profile of which can be seen in more detail in FIG. 4, which will be described subsequently. The packer wheel may comprise a rubber-tired wheel of the type used for a wheelbarrow, though metal wheels may also be used.

In order to pack the soil over the seed which is introduced into the drilled ground by the drilling element 13, a respective further packer element 16 is mounted on the frame 11, rearwardly of the drilling element 13, and is arranged to exert a soil packing (pressing) action on the soil over the seeded rows formed by the drilling element 13. Preferably, the packer element 16 also comprises a so-called "packer wheel", although having a different profile from that of the forward packer wheel 15, as can be seen in FIG. 4e.

Each disc coulter 14 is adjustable in height relative to the frame 11; and may be provided with a trigger/reset mechanism (not shown) which allows the disc to be displaced temporarily from its normal working depth by a buried obstacle e.g. a buried stone, and then after the obstacle has been passed, to revert automatically to its working depth.

FIGS. 1a, b and c show different relative height positions which can be taken up by the packer wheels 15 and 16 and disc coulters 14, as a result of variable ground conditions.

FIG. 1a shows an arrangement in which the rear packer wheel 16 is running on ground at a higher level than the front packer wheel 15;

FIG. 1b shows the packer wheels 15 and 16 at the same level; and

FIG. 1c shows the rear packer wheel 16 running on the ground at a lower level than the front packer wheel 15.

The forward packer wheel 15 is rigidly mounted on the frame 11 by means not shown, and serves as the reference or controlling device for the ground engaging and ground working tools which follow it i.e. disc coulter 14, drilling tool 13 and rear packer wheel 16. In addition to exercising depth and other control, the forward packer wheel 15 also has the following functions:

a) it gives stability and carrying capacity to the implement;

b) it is able to crush "clods", and break them down to smaller fragments, and in addition carries out both a "packing and levelling action on the soil"; and c) plant residue and stubble is broken up, and pressed flat, so that the following coulter blade can cut through this partly broken up surface, and in addition it is easier for the stubble to pass alongside the successive tools which engage it.

It should be noted that each drilling unit (drilling element 13 and associated rear packer element 16) is mounted on the frame 11 at the rear end of trailing arm 27 via mounting bracket 25, whereas the forward packer element (wheel 15) and the disc coulter 14 are mounted on the frame 11 via separate mounting arms (not shown). Therefore, the rear unit (13, 16) is mounted on the frame 11 independently of the packer wheel 15 and disc coulter 14. Therefore, the rear unit is capable of independent movement up and down relative to the frame 11, although the height of the forward end of the frame 11 is at least partly controlled by the forward packer element 15.

Each disc coulter blade 14 is pressed down into the ground by the weight of the implement, and preferably also by the weight transfer mechanism from the propelling vehicle, and as can be seen in FIGS. 1a to c, it maintains a substantially constant working depth, under the control of the forward packer wheel 15 plus the downward force acting on it. The coulter blade 14 cuts through the flattened stubble and plant residue, and carries out a preliminary opening of the soil and formation of a furrow, and which makes it easier for the following seed drilling implement 13 to enter this opened ground and to maintain a required depth. The preferred use of a rotatable coulter disc provides an easy cutting or chopping action on straw and other material which is often present after harvesting.

The seed drilling tool 13 will now be described in more detail, and comprises a tine 17, and a share in the form of a "wing point share" 18 mounted on the lower end of the tine 17, behind a lower "point" 19 of the tine 17. Two upwardly extending supply tubes 20 distribute seed to the share plate 18, and tubes 20 are coupled to a pneumatically driven seed distribution head (not shown) which supplies seed to all of the drilling tools. The tine 17 is able to enter easily the furrow or partly opened soil which has been formed by the preceding coulter blade 14.

The tine 17 with its point 19 has the function of loosening the soil where the coulter blade 14 has cut the ground, and makes it easier for the following share 18 to move through the now disturbed soil surface, and to form seed drills (a pair of laterally spaced rows) into which seed is introduced via the tube 20.

The share 18 is a wing point share, as referred to above, and creates a flat seed bed in a way which will be well-known to those of ordinary skill in the art. It has the function of cutting through and lifting the soil, and any plant residues, to make room for the formation of the two rows of seeds. This is derived by the profile shape of the share.

The rear packer wheel 16 has the functions of:

packing loose soil after the introduction of the seed; and keeping the tine 17 at a required working depth. The rear packer wheel 16 is adjustable in height by a manually operated mechanism as shown, to control the working depth of the drilling implement 13.

FIG. 4 shows the successive ground engaging, and soil working operations which are carried out successively by the implement 10. FIG. 4a shows a typical undisturbed ground profile after a crop has been harvested, and comprising plant residue 21 still anchored in the ground surface, and upwardly projecting stubble 22. FIG. 4 shows use of the implement 10 as a direct drill i.e. to introduce seed into the ground without first having carried out ploughing of the ground or other soil cultivation operations.

Figure 4A:
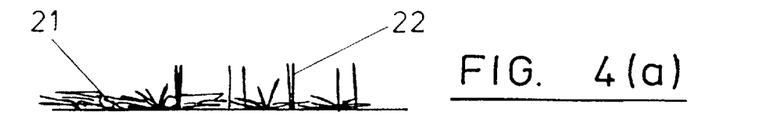
FIGS. 4a, b, c, d and e show the successive stages of ground engagement and soil working operations carried out by the seed drilling implement according to the invention.
Figure 4B:
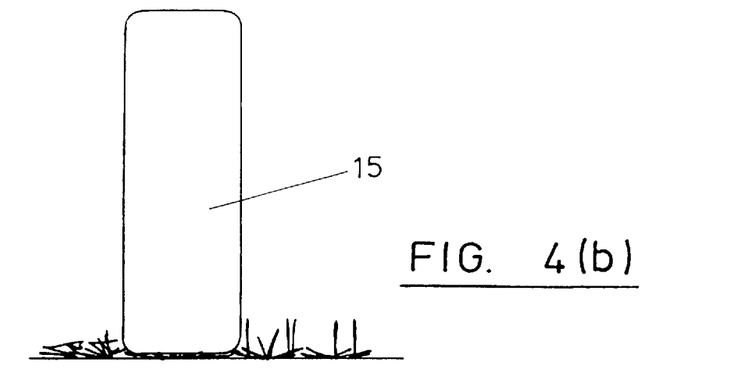
Figures 4C, 4D:
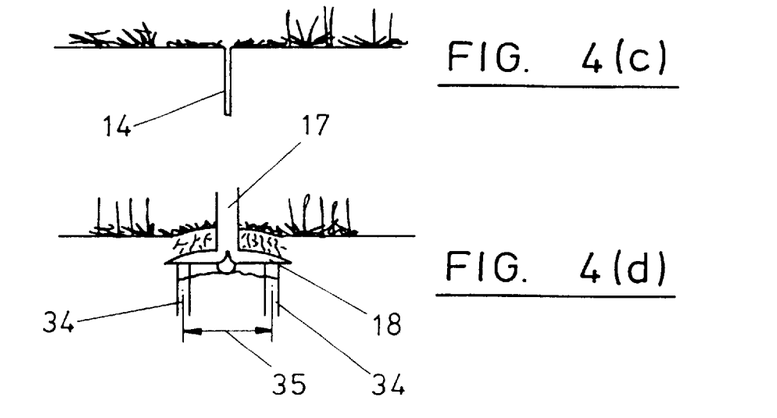
Figure 4E:
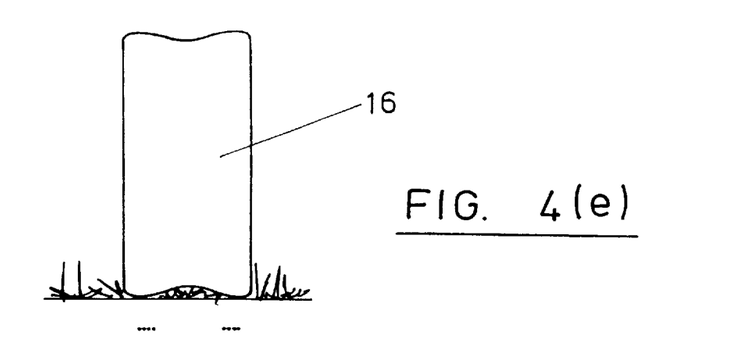

FIG. 4b shows the preliminary ground/soil working operation which takes place, by means of the front packer wheel 15. The packer wheel 15 presses down the stubble 22 and plant residue 21 to make it easier for the following rotatable coulter blade 14 to cut through the stubble and form a slot or groove in the ground, as shown in FIG. 4c. The tine 17 and its share 18 is then able readily to move through the soil, after opening up and formation of a preliminary furrow by the disc coulter 14, as shown in FIG. 4d. The tine 17 and the share 18 cut through and lift the soil to make room for two laterally spaced seed rows 34 to be formed. Each row 34 is usually about 30 mm wide, and the rows are spaced apart by distance 35 of about 125 mm, according to the profile of the share plate.

Finally, the rear packer wheel 16 packs the soil over the seeded rows, after introduction of seed into the rows via the seed distribution tube 20.

Figure 2:
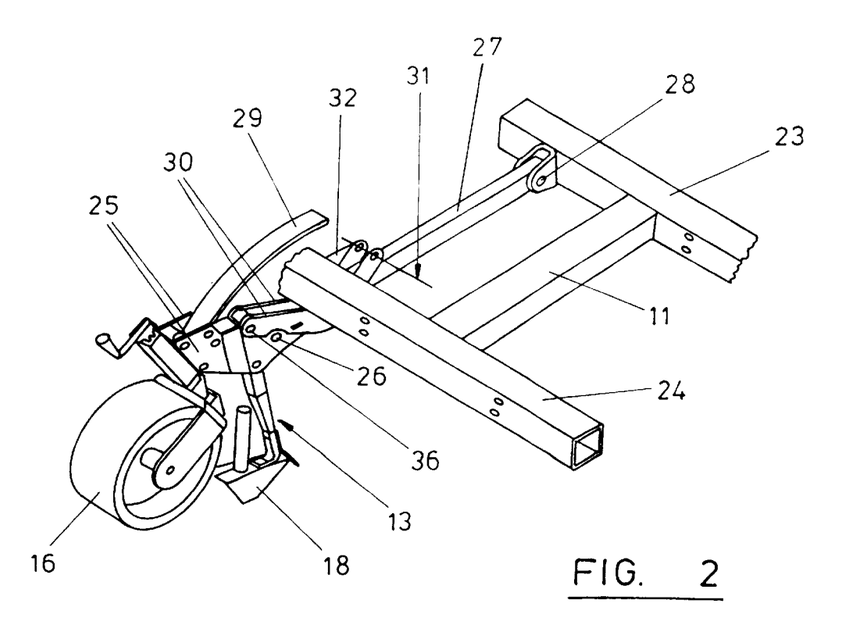
FIG. 2 is a detail and perspective illustration from above of a rear mounted seed drilling component of the implement shown in FIG. 1.
Figure 3:
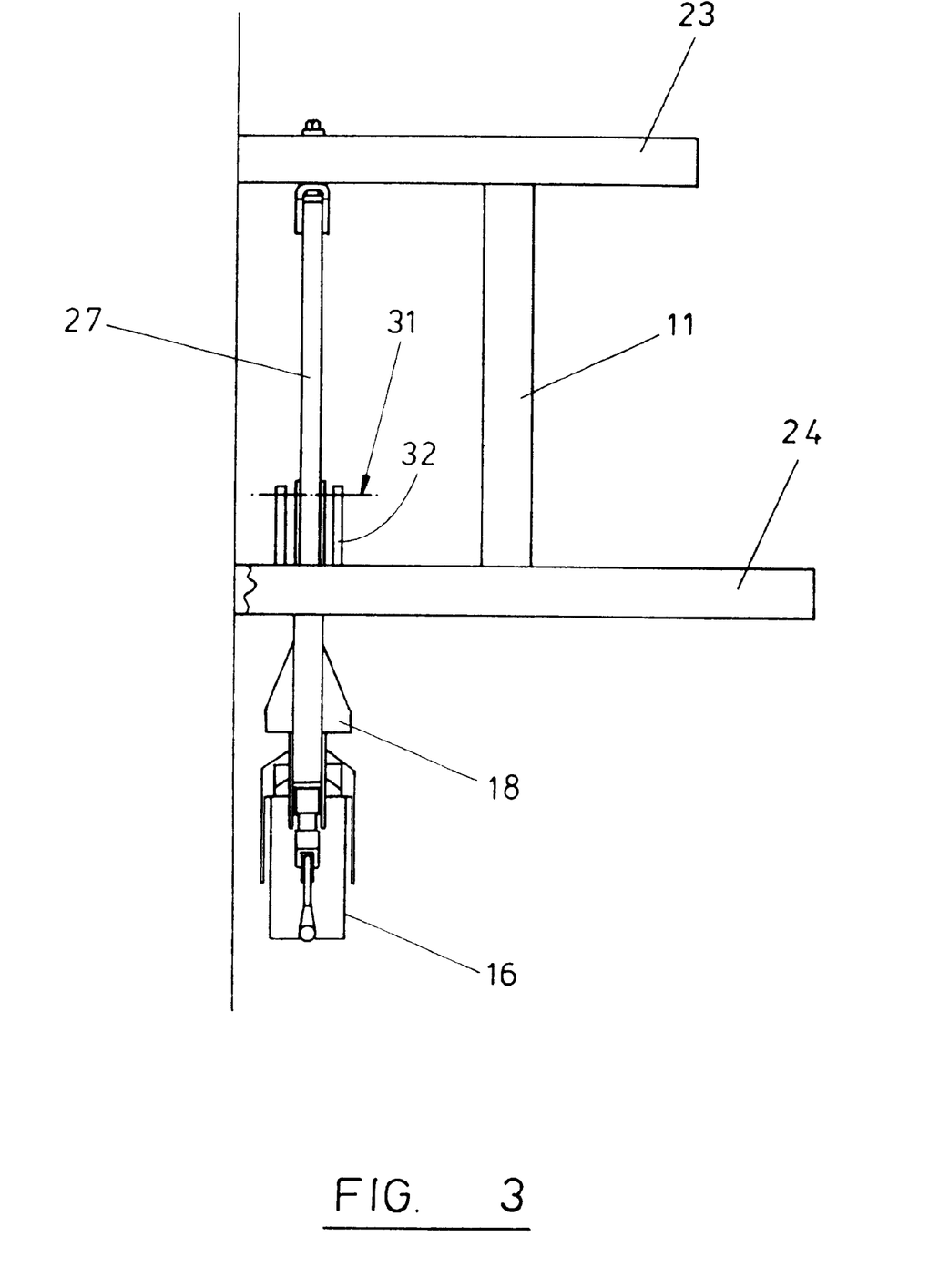
FIG. 3 is a plan view corresponding to FIG. 2.

The construction and operation of the mounting arrangement of the seed drill 13 and rear packer wheel 16 will now be described in more detail, with reference to FIGS. 2 and 3. The general frame 11 of the implement includes a pair of transversely extending support beams 23 and 24, and both the drilling tool 13 and the rear packer wheel 16 are mounted on a common bracket 25 (formed by a pair of spaced bracket plates) which is pivotally mounted on a pivot 26 at the trailing end of a mounting arm 27 which is pivotally mounted at its forward end via pivot 28 to the forward transverse beam 23.

The assembly of bracket 25, seed drilling tool 13 and packer wheel 16 comprise a sub-assembly, carried at the end of a "swing arm" formed by mounting arm 27. However, not only is the arm 27 able to pivot upward and downwardly about forward pivot 28, but also the bracket 25 can adjust itself about pivot 26, under the controlling action of a biasing spring 29 and a bell crank lever 30. The lever 30 is pivoted at its forward end via pivot 31 to a bracket 32 which is secured to beam 24, and at its rear end on a pivot 36 to the bracket 25. The spring 29 is a leaf spring, and which is able to exert a downward biasing force to the bracket 25, and thereby to press the rear packer wheel 16 into contact with the ground, and also to press the drilling tool 13 downwardly and into the ground.

The front packer wheel 15 exercises a control over the working depth of the following tools, but the rear packer wheel 16 also controls the working depth of the tool 13, and FIGS. 1a, b and c show the implement 10 adjusting itself automatically to follow variation in the profile of the ground surface which is being traversed. FIG. 1a shows the position taken up by the rear packer wheel 16 when the ground surface over which it is travelling, at any instant, is higher than the ground level being traversed by the forward packer wheel 15, and which causes the trailing arm 27 to pivot upwardly about its forward pivot 28 to the position shown in FIG. 1a. This also causes the bell crank lever 30 to pivot in an anti-clockwise direction about forward pivot 31, and which thereby adjusts the position of bracket 25 about its pivot 26, so as to vary the inclination of the tine 17 to the vertical, and consequently to vary the inclination of the share 18.

The tine 17 is rigidly fastened to the bracket 25, and the different attitudes taken by the tine 17 and the share 18 can be seen in FIGS. 1a to 1c, and with FIG. 1a representing a situation in which the ground surface being engaged by rear packer wheel 16 is higher than the ground surface being engaged at the same time by forward packer wheel 15; FIG. 1b showing a level situation; and FIG. 1c showing the situation in which rear packer wheel 16 is engaging ground of a lower level than the forward packer wheel 15 e.g. when the packer wheel 16 enters a recess or depression in the ground.

The mounting arrangement of the tool 13 and packer wheel 16 is a self-adjusting arrangement (after manual adjustment of the packer wheel 16 by adjuster 33), which ensures the following technical advantages:

1. the rear packer wheel 16 and the tine 17 with its share 18 can follow the undulations in the ground, by virtue of a four arm linkage having pivot points 26, 28, 31 and 36;

2. the angle of the share is adjusted automatically, dependant upon the undulations in the ground; thus, when there is a recess in the ground e.g. a wheel track, the rear packer wheel 16 moves to a lower position relative to the frame 11. The spring force of spring 29 reduces, but the automatic operation of the mechanism is such as to cause the tilting angle of the share 18 to increase to the adjusted position shown in FIG. 1c. The "seeking action" of the share is therefore increased, and by this means, the share applies an increased turning moment to the bracket about the pivot 26, so as to increase the downward force acting on the rear packer wheel 16 (in addition to the reduced action of the spring 29) so that the rear packer wheel 16 can follow the ground in this recess, and thereby maintain an even drilling depth.

3. The angle of the share can be adjusted so that, during shallow drilling, the angle of the share relative to the ground is small. This ensures that the share can travel smoothly through the soil, and not throw away the soil from the seed furrow when drilling at high speed.

Referring now to FIGS. 5 to 9 of the drawings, a second embodiment of seed drilling implement according to the invention is shown, and which will now be described in detail. FIGS. 5 to 8 show a single seed-drilling tool and related components, to be incorporated in a seed drilling implement according to the invention. FIGS. 5 to 9 show the tool, designated generally by reference 50, and which can be mounted on the frame of the implement in generally similar manner to the mounting of the seed drilling tool 17 of the first embodiment of the invention, as shown in FIGS. 1 to 3.

FIGS. 5 to 8 show a different arrangement of seed drilling tool, mounted on the end of a swing arm, similar to swing arm 27 of the first embodiment. However, the construction, and operation of the tool 50 is different, as will be described in detail below.

As shown in FIGS. 5 to 8, seed drilling tool or element 50 is mounted at the trailing end of a swing arm 51, and the forward end of the swing arm 51 is pivotally mounted on the general frame of the implement (not shown) via a forward pivot 52, and which is generally similar to the forward pivot mounting 28 of the swing arm 27 of the first embodiment. In addition, the frame of the implement will preferably be provided with forward packer elements 15 and coulters 14, as shown in FIGS. 1a to 1c. The drilling tool 50 comprises a tine 53, wing point share 54, and two seed distribution tubes 55 and 56, each of which has a lower discharge end which distributes seed into a respective seed drill formed by the share 54.

The tine 53 is mounted on the swing arm 51 in a different way from the tine 17 of the first embodiment, in that a leaf spring 57 engages directly with the upper end of the tine 53, rather than indirectly via bracket 25 in the first embodiment. Thus, the forward and upper end 58 of the leaf spring 57 is mounted on a fixed part of the frame, whereas the rear and lower end 59 is pivotally connected to an upward prolongation of the tine 53, taking the form of an attached bracket 60, the construction of which is shown in more detail in FIG. 9.

Figure 6:
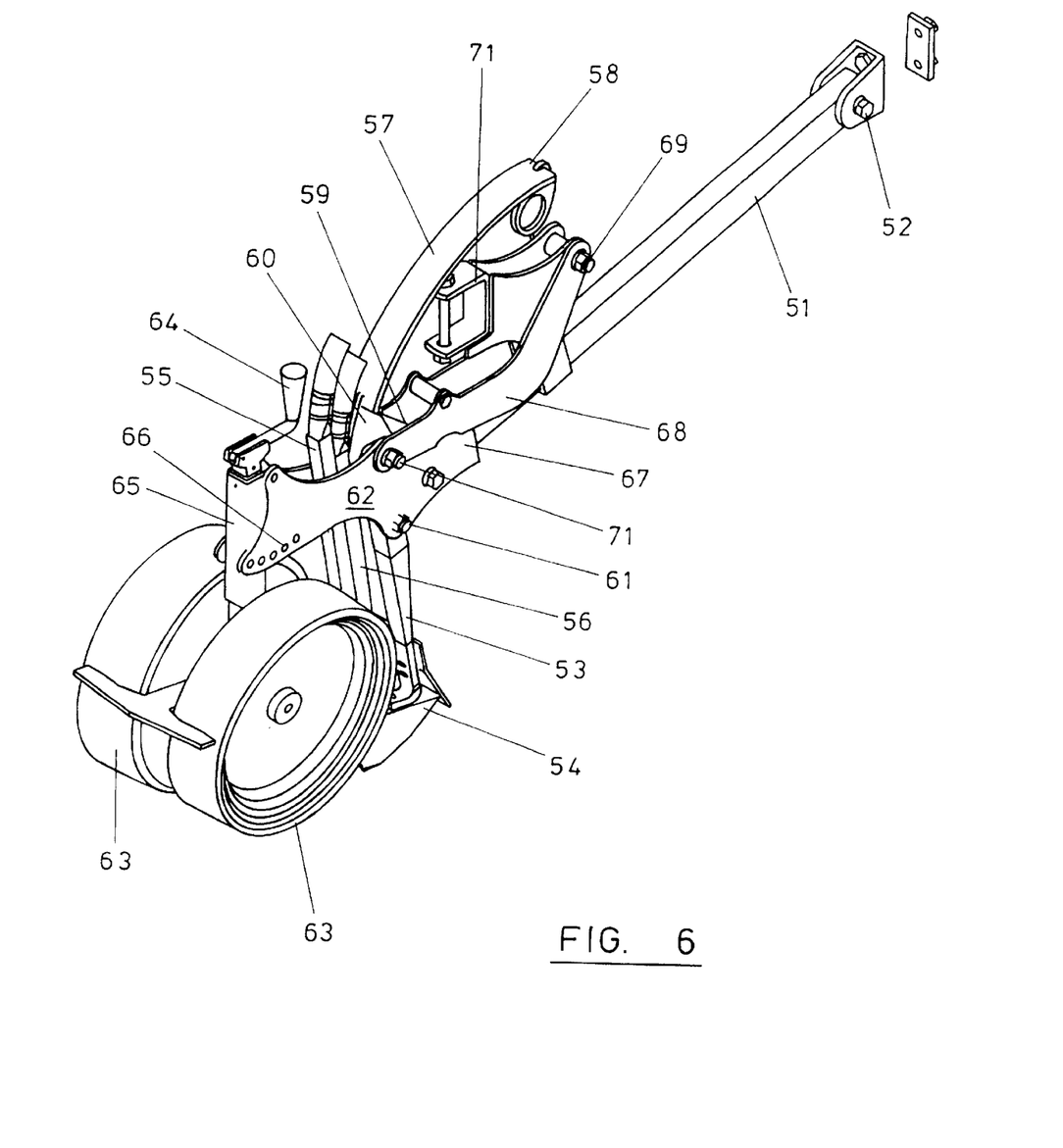
FIG. 6 is a perspective view of the seed-drilling tool of FIG. 5 in the lower position.

The bracket 60 comprises a rigid upward extension of the tine 53, and under the action of the leaf spring 57, is capable of controlling the pivoting of the tine 53 about a pivot 61 which extends through the tine 53, and also through mounting bracket 62. A pair of rear (packer) wheels 63 follow the ground surface, and cause corresponding up and down movement of swing arm 51 about the pivot 52 whenever there is a difference in ground level between the ground surface engaged by the wheels 63, and the ground surface engaged by forward components of the implement i.e. the forward packer wheels 15 of FIG. 1. The wheels 63 are laterally spaced from each other, as can be seen in FIG. 6, by a short distance so that each wheel 63 is located in line with a respective line of seed introduced into a drill via one of the distribution tubes 55 and 56 and formed by the wing point share 54.

By reason of the arrangement whereby the wheels 63 are located very closely behind the tine 53 and the share 54, so that the wheels 63 are able to engage the flowing movement of soil formed by the forward movement of the share 54, the wheels 53 quickly engage this soil and pack it back on top of the drilled row of seed. By this close engagement of the wheels 63 with the flowing movement of soil, this acts to prevent the soil being discharged a long distance away, and which otherwise might cause the soil to be thrown onto neighbouring rows of seed, and thereby create an uneven seed depth. The creation of a substantially uniform depth of seed is highly desirable, so as to cause an even rate of germination. Furthermore, by the close coupled arrangement of the wheels 63 to the tine 53 and share 54, the implement is able to move forward through the ground at high working speeds, while still creating a substantially uniform depth of seed bed.

Furthermore, by arranging the wheels 63 close to the tine 53, a desired depth of seed can be achieved more accurately. The theoretically ideal situation would be to have the tine 53 and the wheel 63 substantially coinciding, although clearly this is not practical. However, by the close coupled arrangement as shown in the drawings, a technically advantageous construction and operation is achieved.

The arrangement of the pair of wheels 63 closely spaced apart from each other by a small distance, (so that the tine 53 and the seed distribution tubes 55 and 56 are generally in line with the narrow gap defined between the wheel 63), is particularly advantageous in allowing rearward pivoting of the tine 53 and the associated components when an underground obstacle is encountered, as described above. The gap defined between the wheels 63 allows this pivoting movement of tine 53, share 54 and distribution tubes 55 and 56, without any obstacle to such movement. Such pivoting movement would not be possible with provision of a close coupled single wheel immediately following i.e. in line with the tine 53 and related components.

The set of wheels 63 follow the ground surface, and initial depth of the share 54 relative to the wheels 63 can be controlled by operation of a manual adjustment 64 which enables the wheel set 63 to be raised and lowered relative to mounting bracket 62. In addition, the attitude of a mounting sleeve 65 relative to the vertical can be adjusted by a suitable locking pin being taken through any desired one of a range of adjustment holes 66 formed in the bracket 62.

The mounting bracket 62 therefore serves as a mounting for pivot 61 on which the tine 53 is mounted, and its rear end carries the set of wheels 63. The forward end 67 of the mounting bracket 62 is rigidly coupled to the trailing end of swing arm 51.

Figure 5:
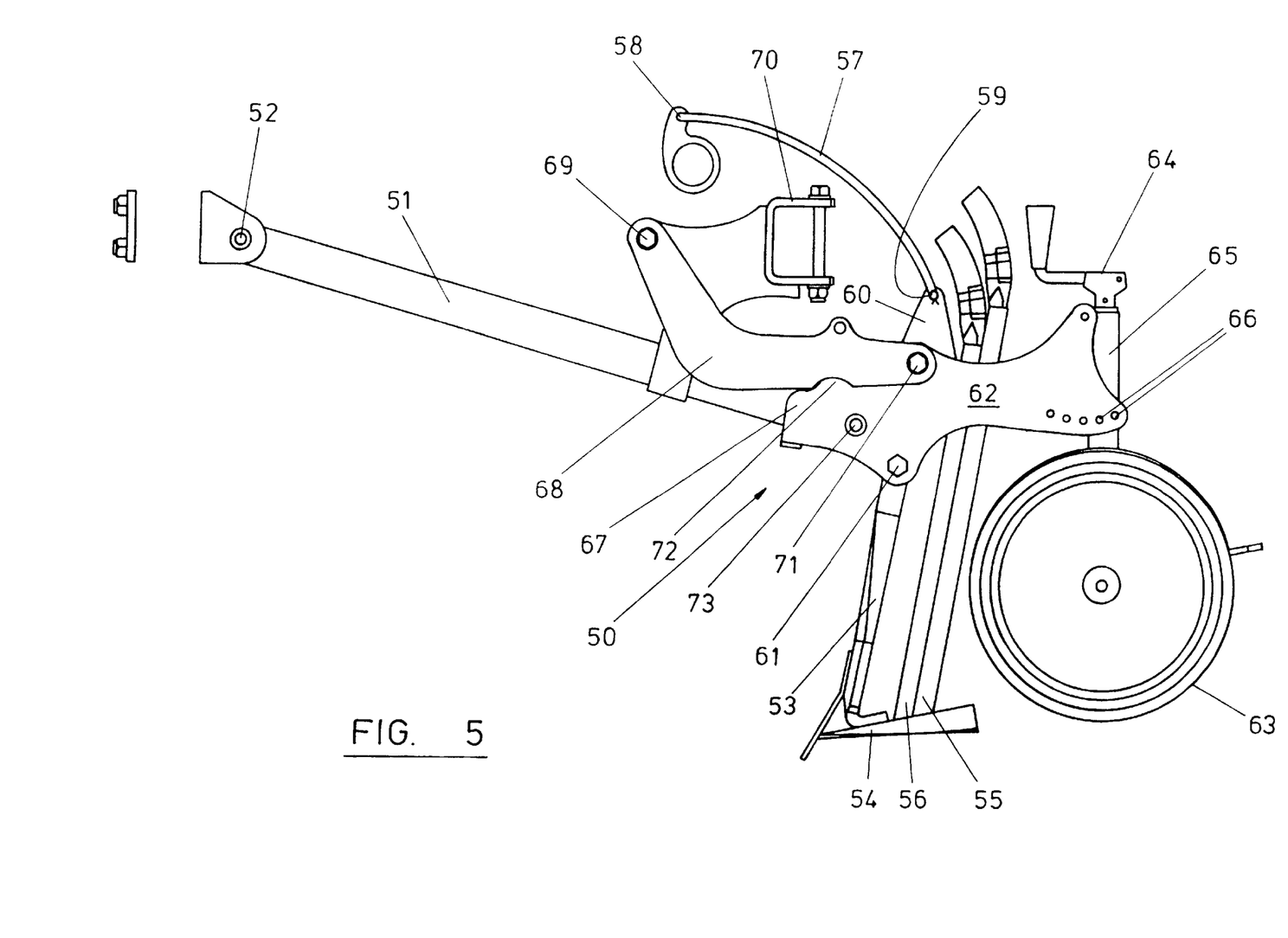
FIG. 5 is a side view of a second embodiment of the invention, and showing the seed-drilling tool in a lowered position.
Figure 7:
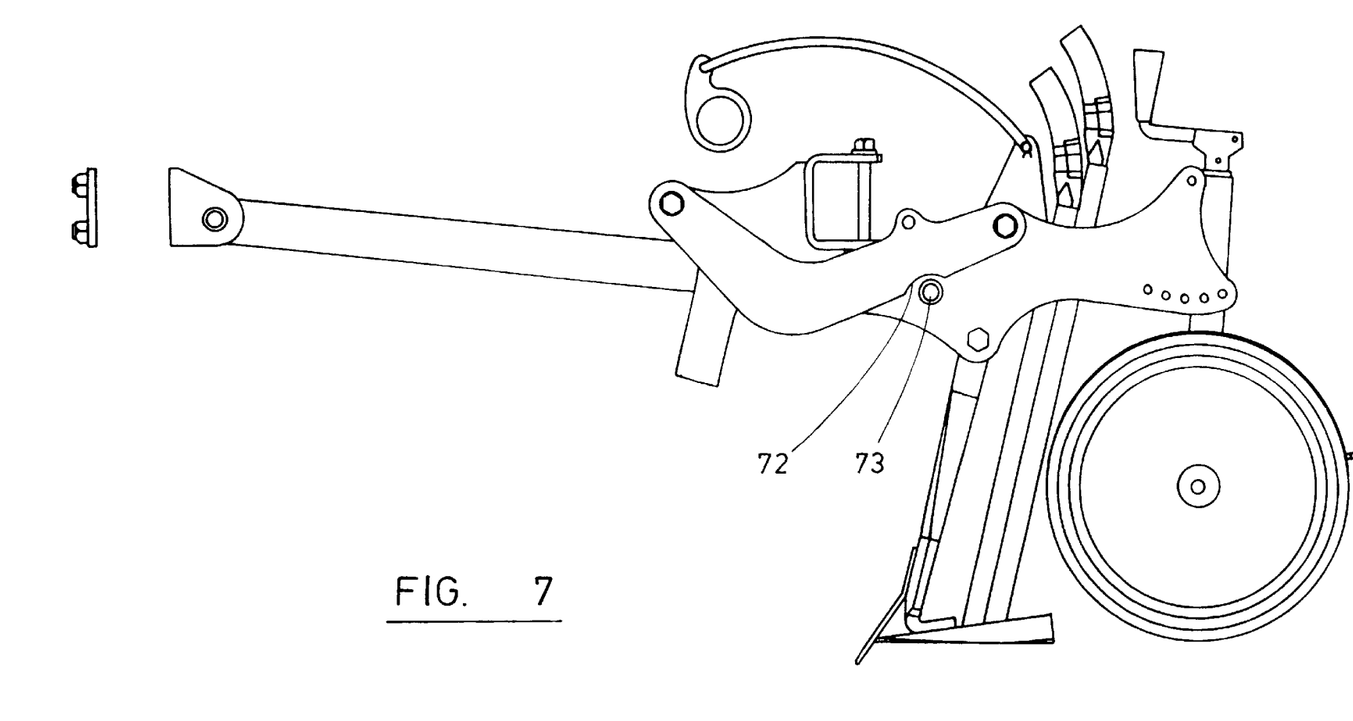
FIG. 7 is a side view of the seed-drilling tool of FIG. 5 in an upper position.
Figure 8:
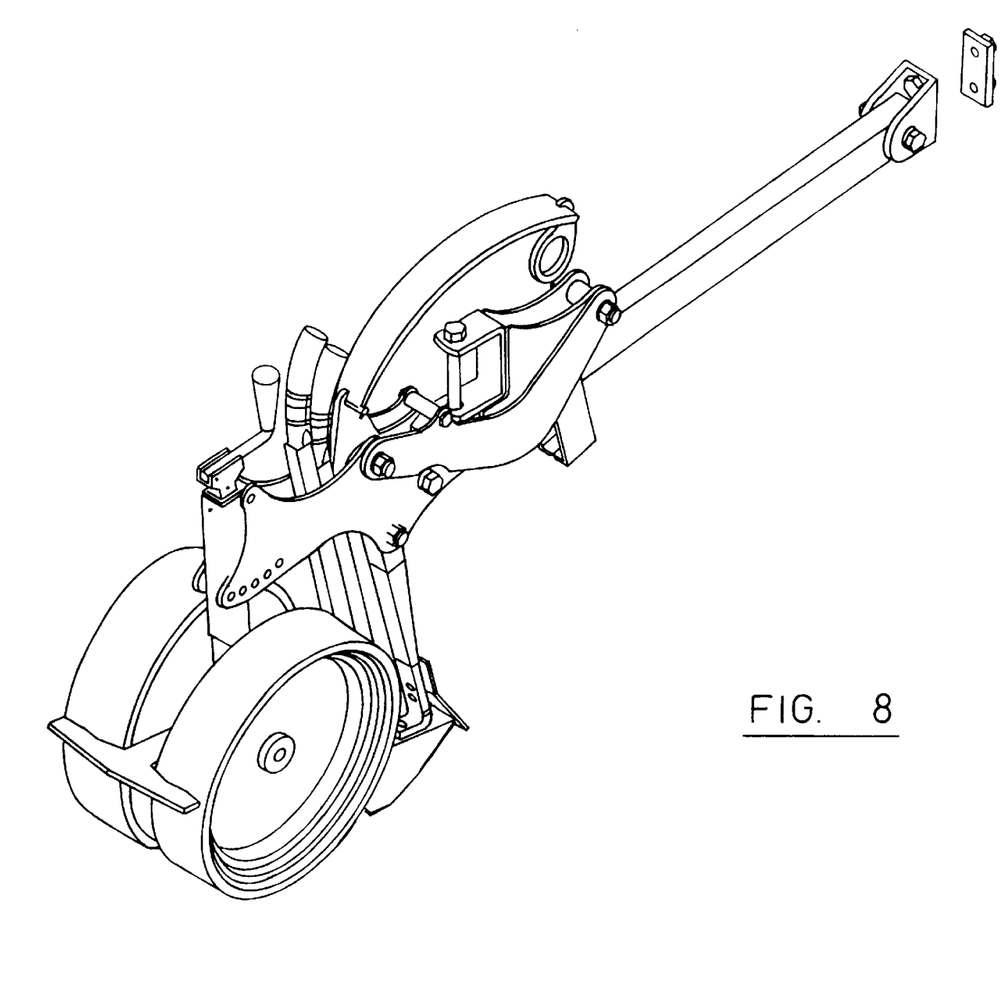
FIG. 8 is a perspective view corresponding to FIG. 7.

A bell crank lever 68, which is similar to bell crank lever 30 of the first embodiment, is pivotally mounted at its forward end via a pivot 69 to part of the fixed frame of the implement, of which a part only is shown by reference 70 in FIG. 5, and the opposite end of the lever 68 is pivotally connected to mounting bracket 62 via pivot 71. FIGS. 5 and 6 show the tine 53 and related components in a lowered position, whereas FIGS. 7 and 8 show the positions taken up by the components in a raised position i.e. the position taken up by the rear part of the implement when the wheels 63 engage a ground surface at a higher level than the ground surface engaged by the forward components of the implement. These Figures show the pivotal adjustments which take place of the bell crank lever 68, and also the change in attitude of the leaf spring 57. It should further be noted that a limit surface 72 is formed along a lower edge of bell crank lever 68, and this engages a limit stop 73 (see FIG. 7) when the upper position is reached.

Figure 9:
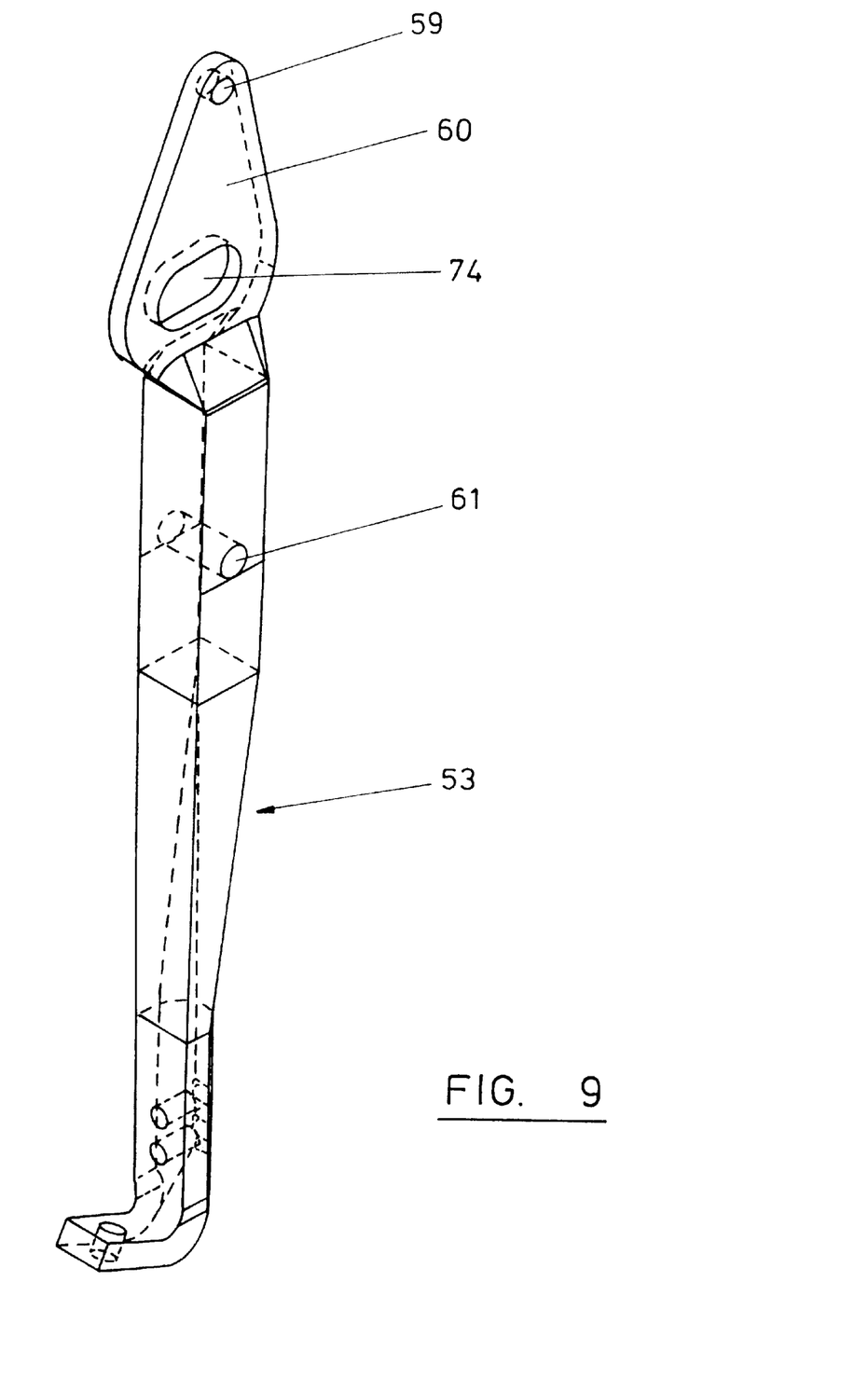
FIG. 9 is a perspective view, from one side, of the seed-drilling tool alone, and showing in more detail its construction, and the means of mounting it on the second embodiment of the invention.

The pivotable mounting of the tine 53 will now be described in more detail, and as can be seen particularly from FIG. 9, a slot 74 is formed in the bracket 60, and which allows a limited amount of pivoting movement of the tine 53 about pivot 61, depending upon ground conditions. The pivot 71, (which may comprise a fastening bolt), extends through the slot 74, and under normal conditions the action of the leaf spring 57 on the bracket 60, via pivot 59, is such as to apply a clockwise turning moment to the tine 53 about the pivot 61, so that bolt 71 is normally pressed against the forward end of the slot 74 i.e. the right hand end of the slot 74 as viewed in FIG. 9, although it will be the left hand end of the slot 74 with respect to the illustration of the tine 53 in FIG. 5.

The leaf spring 57 will tend to maintain the bolt 71 in the end position within slot 74, both when it is in the lower position of FIGS. 5 and 6, or in the upper position of FIGS. 7 and 8. However, as the lower end of the tine 53 and the share 54 move forwardly through the ground, this will apply an anti-clockwise turning moment to the tine 53 about pivot 61, although this is usually resisted by the opposing turning moment applied by the leaf spring 57. However, if the drag force which is exerted against the tine 53 and the share 54 exceeds a predetermined limit, the restoring action of the leaf spring 57 is overcome, and the bracket 60 then pivots forwardly i.e. anti-clockwise as shown in FIG. 5, so that slot 74 then slides over the bolt 71 until the opposite end (the rear end) of the slot 74 engages with the bolt 71. The bolt remains in engagement with the opposite end of slot 74 until the drag force reduces to a level sufficient to allow the leaf spring 57 to restore the normal operating position of the tine 53, which then causes the slot 74 to slide in an opposite direction until such time as the forward end of the slot 74 is again engaged with the bolt 71.

Therefore, if the point of the share 54 gets caught against a buried stone, root or other sub-surface obstacle, the tine 53 is able to yield in an emergency situation, against the action of the spring 57, with corresponding pivoting movement of the tine 53 and sliding movement of the slot 74 over the bolt 71. This minimises the risk of damage being done to the ground working components, in that the yielding of the tine 53 will usually allow it to become disengaged from the obstacle during the further forward movement of the implement. After the obstacle has been passed, the spring 57 then reverts the tine to the required inclination to the vertical, under the action of the spring 57.

Accordingly, the second embodiment shown in FIGS. 5 to 9 has an additional "tripping and resetting mechanism", via the way in which the drilling tool 50 is mounted. This is additional to the facility to follow undulation in the ground, as provided by the first embodiment, whereby swing arm 51 can pivot upwardly and downwardly to follow relative undulations, in generally similar manner to the upward and downward movement of swing arm 27 in the first embodiment.

Figure 10:
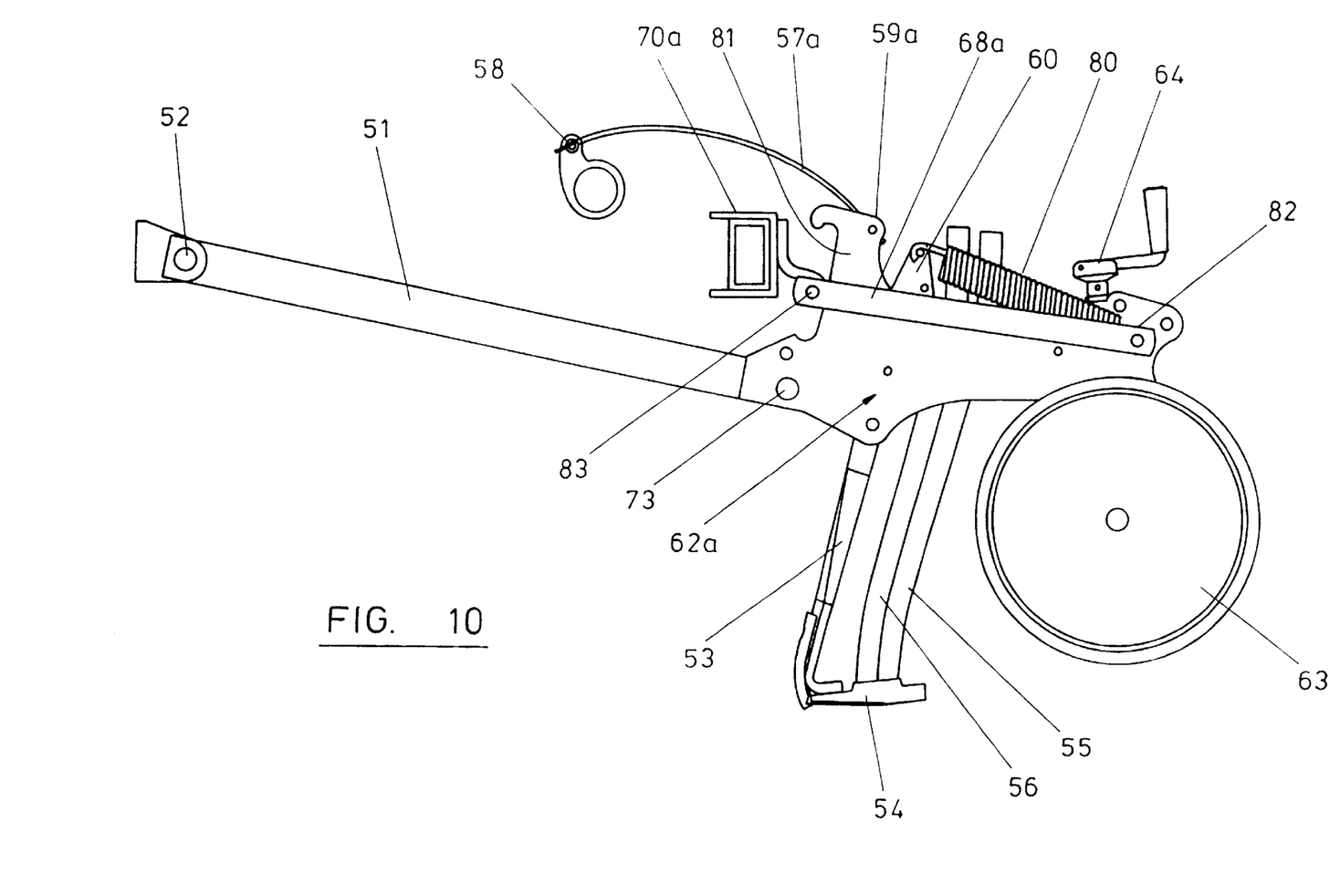
FIG. 10 is a side view of a third embodiment of the invention.

Referring now to FIG. 10 of the drawings, there is shown a further embodiment of implement in side view, and parts which are the same as those already described and shown in previous figures are given the same reference numerals. In addition, parts which are modified relative to previously described components are given the same reference numerals, but with the addition of the letter a.

The drilling unit is a sub-assembly which comprises tine 53 and related components, namely share 54, seed distribution tubes 55 and 56, and a pair of rear packer wheels 63, and this sub-assembly is mounted on the trailing end of swing arm 51, mounted at its forward end 52 on the frame 11. A modified mounting bracket 62a is mounted on the swing arm 51, and carries the drilling unit and the rear packer elements, but the construction and arrangement is such that additional spring biasing is provided.

In the embodiment shown in FIG. 5, leaf spring 57 performs a dual function, namely it applies downward loading to the sub-assembly, but also applies a biasing force which resists linear displacement of the tine 53 and share 54, up to a predetermined limit. The leaf spring 57 can be overcome, when a significant ground obstacle is encountered. However, by requiring the leaf spring 57 to perform two separate functions, the setting of the spring loading necessarily has to be a compromise. Thus, there are two possible ground variations, namely variation in the ground profile via its undulations, and variation in the resistance to drilling presented by the soil.

The embodiment of FIG. 10 provides two separate resilient biasing of the sub-assembly at the trailing end of swing arm 51, and which allows individual spring biasing to be altered solely to meet the particular function. In particular, leaf spring 57 is replaced by leaf spring 57a, which has its forward and upper end 58 mounted on a fixed part of the frame, whereas in this embodiment the rear end 59a is mounted on an upstanding portion 81 of modified bracket 62a. This is different from the arrangement of FIG. 5, in which the rear end 59 of leaf spring 57 is mounted on an upstanding bracket 60 which forms a rigid upward prolongation of tine 53. The spring 57a, acting via modified bracket 62a, therefore has the function of exerting a required downward biasing force to the sub-assembly, and to assist in maintaining required depth of the lower tip of the tine 53 and share 54.

FIG. 10 has an additional resilient biasing arrangement, in the form of a set of springs 80, which react between upstanding bracket 60 and the modified bracket 62a, in order to apply a biasing force to the upper end of the tine 53, so as to withstand drag forces exerted on the tine 53 by the soil. The tension in the springs 80 can be adjusted to suit requirements, and if the drilling implement is working in loose soil, the springs 80 can be adjusted to give less restoring force. This can be set to give just enough force to keep the tine in position during normal operation, but to allow the tine to pivot rearwardly when a ground obstacle is encountered.

Therefore spring 57a can be adjusted to set any required downward force on the tine 53 and the packer wheel 63, with this downward force depending upon particular soil conditions i.e. loose or hard conditions. This adjustment can be done independently of the resilient biasing force applied to the tine 53 (required to give forward biasing force to the lower end of the tine 53 and the share 54 to resist soil drag forces. This adjustment is achieved independently by suitable adjustment of the springs 80.

In addition to modification of the mounting bracket 62 to take the form shown by reference 62a, the crank lever 68 of FIG. 5 also is modified to take the form of straight lever 68a, shown in FIG. 10. Lever 68a has the same functions as bell crank lever 68, and is pivotally connected at its rear end 82 to the modified bracket 62a, and is connected at its forward end 83 to a fixed part 70a of the support frame 11.

Figure 11:
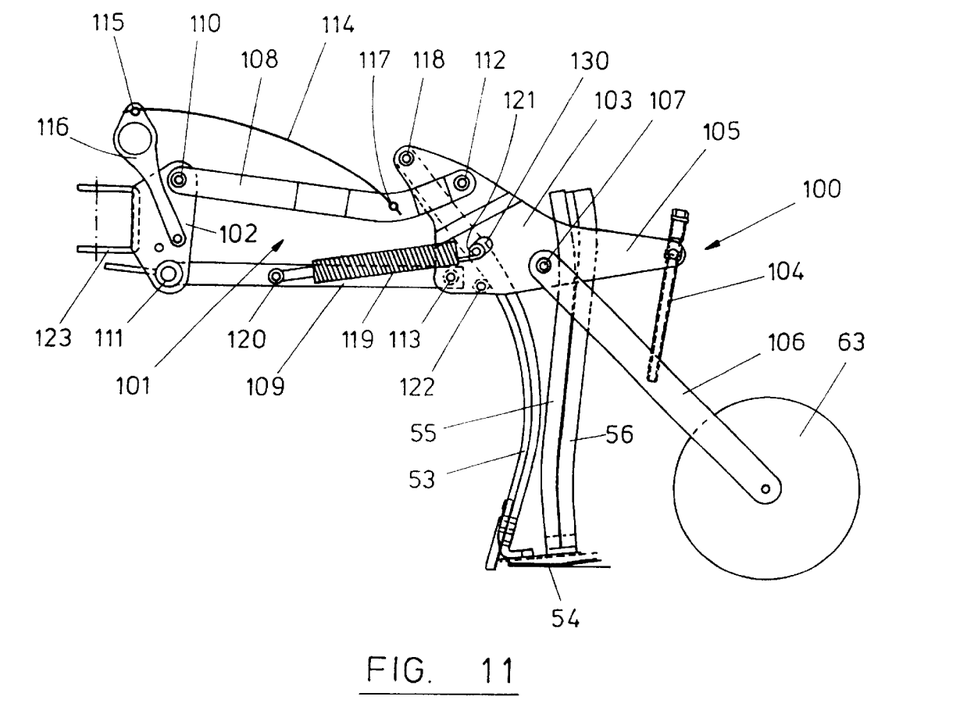
FIG. 11 is a side view of a fourth embodiment of the invention.
Figure 12:
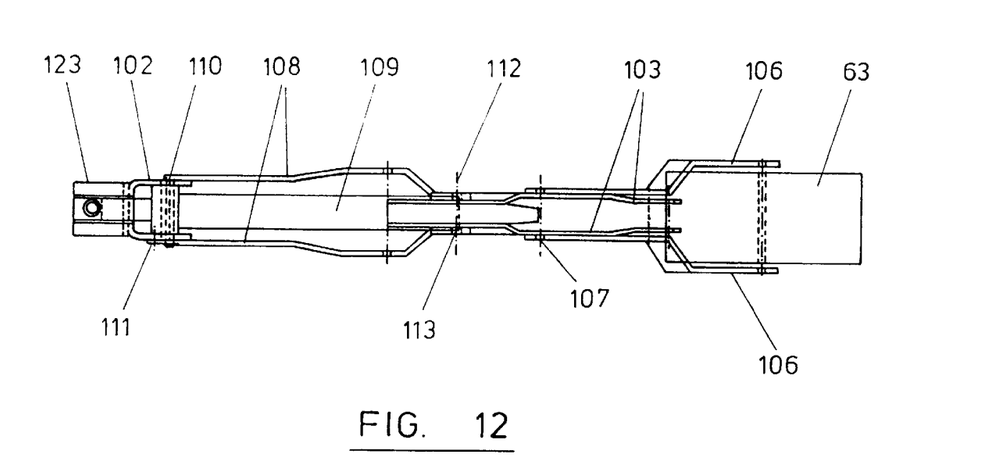
FIG. 12 is a plan view corresponding to FIG. 11.

Referring now to FIGS. 11 and 12 of the drawings, the rear part of the fourth embodiment is shown in side and plan view, and it should be understood that the forward part of the seed drilling implement may comprise a front mounted arrangement of packer wheels and coulters as described above with reference to FIGS. 1 to 3. Parts corresponding with those already described with reference to the previous figures are given the same reference numerals, and will not be described in detail again.

The rear part of the implement shown in FIGS. 11 and 12 is designated generally by reference 100, and comprises sets of parallelogram linkages 101 which mount drilling elements 53, distribution tubes 55 and 56, and rear packer wheels 63. The sets are spaced apart laterally of the frame of the implement, of which part of a fixed transverse mounting bar is shown by reference 23 (FIG. 2). Each parallelogram linkage 101 is mounted on a mounting bar of the frame of the implement (see reference 23 in FIG. 2) by a forward mounting bracket having forward horizontal flanges 123, and rearward vertical flanges 102. The parallelogram linkage 101 is built up from four "arms", of which one opposed pair of arms is formed by flanges 102 at the forward end, and by a U-shaped support bracket 103 at the rear end, (which carries the drilling element 53, seed distribution tubes 55 and 56, and the rear packer wheels 63). The rear packer wheel 63 is height adjustable, by operation of an adjustment rod 104 which reacts between a trailing end 105 of the carrying bracket 103 and a pair of mounting arms 106 which carry the packer wheel 63 at their lower ends, and which are pivotally mounted at their upper ends 107 on the carrying bracket 103.

The other two "arms" of the parallelogram linkage 101 are formed by upper and lower mounting bars 108 and 109 respectively, pivotally connected at their forward ends 110 and 111 to the mounting flanges 102, and at their rear ends 112 and 113 to the carrying bracket 103. The pivotal connections 110 to 113 form the four pivot connections of the parallelogram linkage 101, and the arrangement is such that the carrying bracket 103 is constrained to move up and down, relative to the remainder of the implement, to follow variation in the ground profile. As shown in the plan view of FIG. 12, a single rectangular tube forms the lower arm 109 and a pair of spaced bars form the upper arm 108.

A leaf spring 114 reacts between the mounting flanges 102 and the upper arm 108 of the parallelogram linkage 101, and applies a downward biasing force to the linkage 101, and therefore also to the carrying bracket 103. Leaf spring 114 reacts between the upper end 115 of a lever arm 116 which is adjustably mounted on flanges 102, and a pivot connection 117 on the upper arm 108 near to the rear pivot connection 112.

The leaf spring 114 therefore applies a downward biasing force to the linkage 101, whereas the rear packer wheel 63, via its contact with the ground and support arms 106, applies an upward force to the carrying bracket 103. The leaf spring 114 and the rear packer wheel 63 therefore exert a joint controlling action on the carrying bracket 103, in order to control the working height of the drilling element 53 and the related distribution tubes 55 and 56. By virtue of the parallelogram linkage 101, the drilling element 53 is able to move up and down while still maintaining the same pre-set working angle to the vertical.

The drilling element 53 is pivotally mounted at its upper end 118 to the carrying bracket 103, and is pulled in a forward direction about pivot 118 by a pair of tension springs 119 (not shown in FIG. 12) each of which act between a mounting point 120 on one side of the lower arm 109 and one end of a mounting pivot 121 extending through the drilling element 53. An adjustable stop 122 restricts forward pivoting movement of the drilling element 53 about the upper pivot point 118 i.e. limits clockwise pivoting of the drilling element 53 about the pivot point 118, and can be adjusted to set any required working angle of the drilling element 53 to the vertical.

During movement of the drilling element 53 through the ground, a rearward reaction force will be applied to the tip of the element, tending to pivot the drilling element 53 rearwardly, and in an anti-clockwise direction about the upper pivot point 118. However, up to a predetermined value of ground load, this can be resisted by the tension springs 119. However, if an excessive ground load is applied e.g. when striking against a boulder or other obstruction, the biasing force of the springs 119 can be overcome, allowing the drilling element 53 to pivot rearwardly and thereby avoid damage being done. After further forward movement of the implement, and with the obstacle having been passed, the drilling element 53 is able to be restored to its normal drilling position under the action of the tension springs 119.

The parallelogram linkage 101 operates in such a way that the angle of the share of the drilling element is maintained the same, for all positions taken up by the parallelogram linkage. This is different from the other embodiments, in which the angle of the share is automatically adjusted by the support mechanism, to adapt the share to different sewing depths and undulations in the ground. However, in the embodiment of FIGS. 11 and 12, a different means of adjustment of the angle of the share, (by adjustment of the angle of the drilling element to the vertical), is obtained, as described below.

The adjustable stop 122 is a hexagon nut having an eccentric hole, and supported by a pin which is mounted between the two plates forming the U-shaped carrying bracket 103. After adjustment of the stop 122, it is clamped in this position between the two plates of the bracket 103. However, the limit position of the tine (drilling element) 53 can be adjusted, by rotating the hexagonal nut about the pin in order to take up a different position. Upon turning of the stop 122, the distance from the centre of the supporting pin to the contact point between the hexagonal nut and the tine 53 is adjusted. The result of this action is that the tine 53 is pivoted through a small angle about the upper pivot point 118, and thereby the angle of the share 54 is adjusted as well. When the soil condition varies, the angle can be adjusted to adapt to the changed soil conditions. When a hexagonal nut is used to form the adjustable stop 122, a stepwise adjustment of the angle of the share 54 can be obtained. If the hexagonal nut forming the stop 122 is changed to a circular external shape, then stepless adjustment can be obtained.

The pair of tension springs 119 comprise biasing means urging the tine 53 into contact with the adjustable stop 122. The mounting pin 121, which supports the right hand ends of the springs 119, projects outwardly of the two plates of the carrying bracket 103 to form projecting ends on which the spring ends can be fastened. A slot 130 is formed in each of the plates of the U-shaped carrying bracket 103, to receive the mounting pin 121. The slots 130 allow the mounting pin 121 to move along the length of the slot, to allow pivoting of the drilling element 53 about the upper pivot point 118. The slots 130 therefore permit movement of the mounting pin 121 when adjustment of the share angle is made. The slot also allows the drilling element 53 to move rearwardly, against the action of the restoring force of the springs 119, when a ground obstacle is met. The length of the slots 130 are set so as to limit rearward movement of the drilling element 53, and to prevent the drilling element coming into contact with the rear packer wheel 63.

The downward biasing force applied to the linkage 101 (and therefore also to the carrying bracket 103 and attached components) is set by the leaf spring 114. The spring force of the leaf spring 114 can be adjusted, when it is required to adapt the biasing force to suit different soil conditions, by adjustment of the lever arm 116 about its pivot mounting on the vertical flanges 102 of the forward mounting bracket.

This fourth embodiment shown in FIG. 11 is a further example of means whereby the working depth of the rear mounted components of a drilling implement can be controlled, and is a technically simplified solution to the problem of providing satisfactory control, and also reduces weight, complexity and cost, compared with known arrangements.

We claim:

1. A seed drilling implement which comprises:
   a frame;
   a drilling element mounted on the frame at or near a rear end of the frame;
   a coulter mounted on the frame forwardly of the drilling element and operable to carry out preliminary opening of the ground prior to engagement of the opened ground by the drilling element;
   a forward packer element mounted on the frame forwardly of the coulter and arranged at least partly to support the frame so as to control an operating depth of the coulter and the drilling element;
   a rearward packer element mounted rearwardly of the drilling element, and arranged to exert a soil-packing operation over each seeded row formed by the drilling element, the drilling element and rearward packer element being mounted on a common mounting bracket, which is pivotally mounted at a trailing end of a swing arm; and
   a bell crank lever and a spring, each mounted on the frame, and coupled with the mounting bracket, and operative to control a position taken up by the drilling element so that the drilling element can follow a varying ground profile.

2. An implement according to claim 1, in which the drilling element comprises a tine having a share mounted thereon and arranged to form at least one seed drill in a furrow formed by the coulter.

3. An implement according to claim 2, in which the share is arranged to form two laterally spaced seed-receiving rows.

4. An implement according to claim 3, including a seed distribution tube leading to the share, and arranged to distribute seed into the seed-receiving rows formed by the share.

5. An implement according to claim 1, in which the forward packer element comprise packer wheels.

6. An implement according to claim 1, in which the coulter is adjustable in height relative to the frame.

7. An implement according to claim 6, in which the coulter has an associated trigger/reset mechanism which allows the coulter to be displaced temporarily from a normal working depth by a buried obstacle, and then to revert automatically to the working depth after the obstacle has been passed.

8. An implement according to claim 1, in which the rearward packer element comprises a packer wheel.

9. An implement according to claim 1, in which the coulter comprises a rotatable disc coulter.

10. An implement according to claim 1, in which the mounting bracket and drilling element and rearward packer element form a subassembly mounted on the frame independently of the mounting of the forward packer element and coulter.

11. A seed drilling implement which comprises:
    a frame;
    a drilling element mounted on the frame at or near a rear end of the frame;
    a coulter mounted on the frame forwardly of the drilling element and operable to carry out preliminary opening of the ground prior to engagement of the opened ground by the drilling element;

a forward packer element mounted on the frame forwardly of the coulter;

a rear packer element associated with the drilling element;

a mounting bracket on which the rear packer element is mounted, and which is coupled with a rear end of a swing arm, the rear packer element being engageable with the ground to follow its surface, and to cause upward and downward adjustment of the swing arm as a consequence of ground undulations;

a pivot carried by said mounting bracket, and on which is pivotally mounted a tine carrying a share at a lower ground engaging end of the tine;

a resilient biasing arrangement operative to apply a restoring moment to the tine so as to provide resilient biasing to the tine in opposition to drag forces applied by the ground to the tine and the share; and means permitting limited pivoting movement of the tine against the biasing arrangement when the drag force exceeds a predetermined limit.

12. An implement according to claim 11, in which the biasing arrangement comprises a leaf spring reacting from one end with a fixed part of the frame and from its opposite end to a bracket forming a rigid upward prolongation of the tine above the pivot.

13. An implement according to claim 12, in which a slot is formed in the bracket, and which defines limit positions for pivotal movement of the tine via engagement of a fastening bolt with one or the other end of said slot.

14. An implement according to claim 11, including a tandem wheel set mounted rearwardly of the tine, and defining a gap therebetween which allows pivotable movement of the tine about the pivot in response to varying ground drag forces applied to the share of the tine.

15. An implement according to claim 14, in which the tandem wheel set is mounted at a rear end of the mounting bracket which carries the pivot on which the tine is pivotally mounted, and a bell crank lever is pivotally mounted on the bracket via a fastening bolt which extends through a slot in the bracket forming an upward projection of the tine.

16. A seed drilling implement which comprises:

a frame;

a drilling element mounted on the frame at or near a rear end of the frame;

a coulter mounted on the frame forwardly of the drilling element and operable to carry out preliminary opening of the ground prior to engagement of the opened ground by the drilling element;

a forward packer element mounted on the frame forwardly of the coulter and arranged at least partly to support the frame so as to control an operating depth of the coulter and the drilling element;

a rearward packer element mounted rearwardly of the drilling element, and arranged to exert a soil-packing operation over each seeded row formed by the drilling element; and a first resilient arrangement which is operative to apply a downward biasing force to the drilling element and rearward packer element, and a second resilient arrangement which is operative to apply a restoring force to the drilling element to resist soil drag forces.

17. An implement according to claim 16, in which the drilling element is mounted on the frame via a respective parallelogram linkage.

18. An implement according to claim 17, in which a leaf spring reacts between the frame and the parallelogram linkage in order to apply a downward biasing force to the parallelogram linkage.

19. An implement according to claim 17, in which a rear packer wheel supports a carrying bracket on which the drilling element is mounted, said packer wheel being height adjustable relative to the carrying bracket in order to control a working depth of the drilling element.

20. An implement according to claim 19, in which the drilling element is pivotally mounted on the carrying bracket, and is resiliently biased so as to resist rearward forces applied to a tip of the drilling element by the ground.

21. An implement according to claim 20, in which a spring acts between a lower arm of the parallelogram linkage and the drilling element to apply a restoring moment to the drilling element.

* * * * *